Aug. 18, 1953     C. E. BADIK ET AL     2,649,261
DEVICE FOR RETAINING REEL CONNECTORS
Filed Aug. 2, 1951
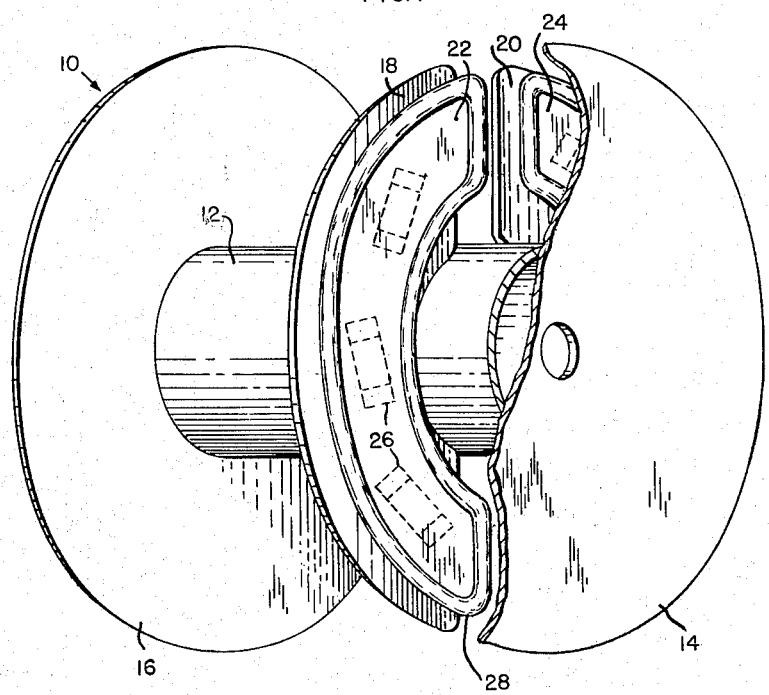
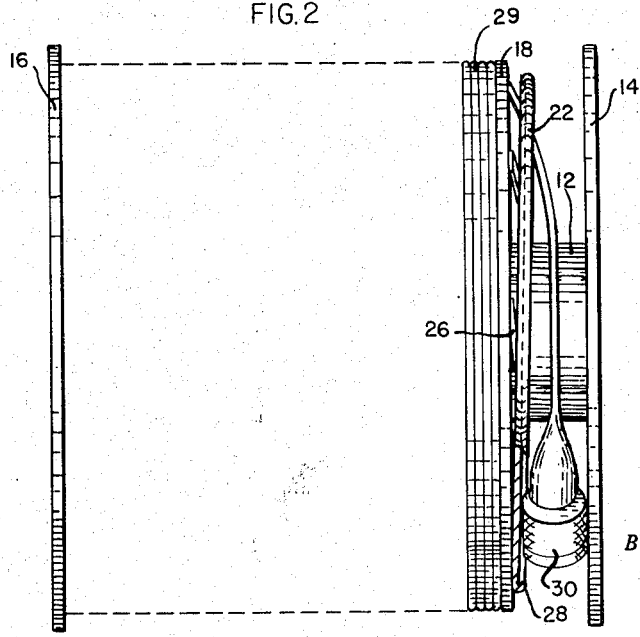
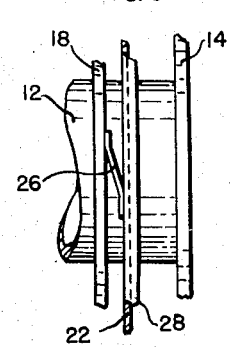
*INVENTOR.*
CORNELIUS E. BADIK
JOHN J. REILLY JR.
BY Harry M. Saragovitz
*Attorney*

Patented Aug. 18, 1953

2,649,261

UNITED STATES PATENT OFFICE 2,649,261

DEVICE FOR RETAINING REEL CONNECTORS

Cornelius E. Badik, Long Branch, and John J. Reilly, Jr., Irvington, N. J., assignors to the United States of America as represented by the Secretary of the Army Application August 2, 1951, Serial No. 240,022

2 Claims. (Cl. 242—117)

(Granted under Title 35, U. S. Code (1952), sec. 266)

The invention described herein may be manufactured and used by or for the Government for governmental purposes, without the payment of any royalty thereon.

The present invention relates particularly to cable reels.

For transporting and subsequent paying out of cable, the cable is usually wound upon a reel, which comprises essentially a central core and two end plates secured upon said core. The cable is wound upon the core in successive layers until the last layer reaches the periphery of the end plates.

In modern usage it has been found that particular types of cable, particularly in communication lines, are laid in series, i. e., upon the termination of the cable in any one reel, another length of cable wound upon a second reel is joined to said first mentioned cable line. For making such connections, the use of heavy and cumbersome connectors may often be required at each end of the cable. In coiling any length of cable upon a reel, the problem of securing the connectors is of prime importance, particularly when it is desired to utilize only a portion of the cable and in such instances, the use of both connectors is required. It is, therefore, an object of the present invention to provide a cable reel having provision for securing cable connectors in such a manner as to have the connectors readily available regardless of the amount of cable to be used.

This is accomplished by providing a space upon the core of the reel for holding the connector of one end, or connectors of both ends of a length of cable, in fixed secured position. To achieve this purpose, there are provided upon the core of the reel a fixed plate and a spring-supported pressure plate whereby a space is bounded between the pressure plate and one of the end plates within which space the connectors of the cable can be secured as hereinafter pointed out.

The invention can be more readily understood from the following description taken in view of the accompanying drawing in which:

Fig. 1 is an isometric view of a preferred embodiment of the invention with one end of the end plates broken away to show the construction of the fixed plates and pressure plates more fully hereinafter described;

Fig. 2 is a side view of the device shown in Fig. 1, which shows a cable and connector in place on the reel, and Fig. 3 is a fragmentary view of the core of the reel, of the fixed plates and pressure plates and the spring means between said plates.

Referring to the drawing, there is shown a reel 10 comprising a central core 12 and two end plates 14 and 16. Spaced a short distance from the end plate 14 is a split annular ring comprising two semi-circular plates 18 and 20 which are rigidly secured to the drum 12 by any conventional means such as welding, brazing, soldering, etc. Each of the plates 18 and 20 are coplanar and are equally spaced from the end plate 14. Positioned between the plates 18 and 20 and the end plate 14 is a split pressure member composed of two semi-circular pressure plates 22 and 24, provided with rolled edges 28, each of which is held to and spaced from the plates 18 and 20, respectively, by means of a plurality of leaf springs 26. Each leaf spring 26 is shaped generally in the form of a relatively flat S, having their ends bent in opposite direction. One end of each of the said springs 26 is secured to one surface of the pressure plates 22 and 24 and the other end of the springs is secured to the fixed plates 18 and 20. In this manner the pressure plates 22 and 24 are spring supported so that each of said pressure plates 22 and 24 can be urged against the fixed plate upon the application of any pressure thereto. The pressure plates 22, 24, when in normal usage, i. e., when there is no cable end forced into the area between the pressure plates 22, 24 and the end plate 14, the pressure plates are coplanar and spaced equidistant from the end plate 14. However, upon the exertion of any force upon either of said pressure plates, the distance between the end plate and either one of said pressure plates will be increased. It will thus be apparent that if any object having a dimension greater than that of the space between the end plate 14 and the pressure plate 22 is introduced into said space, either or both of said pressure plates will be urged in the direction toward the fixed plates 18 and 20. It will also be apparent, as seen from the drawing, that the slots between the pressure plates 22 and 24 and the slots between the fixed plates 18 and 20 are in register.

In utilizing the reel herein described, there is shown in Fig. 2 an assembly showing a cable 29 wound upon a reel, said cable having a connector 30 at one end thereof. When the last layer of cable is wound upon a reel and it is desired to secure the connector, a short length of the cable is introduced through the slots between the fixed plates 18 and 20 and the slot in register with it, and the connector is wedged into the space between the end plate 14 and one of said pressure plates 22, 24. As the connector has a dimension greater than that of the space between the pressure plate 22 and the end plate 14, the pressure plate will be urged toward the fixed plate 22. As the tension of the springs 26 will tend to urge the plate 24 away from the fixed plate, the connector will be held securely in place and the rolled edges 28 of the pressure plate will restrain the connector from falling out of its fixed position between the pressure plate and the end plate.

While there has been herein described one specific embodiment of the invention, it is obvious that modifications can be made without departing from the spirit and scope of the invention. Thus, for example, in place of having split rings serving as both fixed and pressure plate elements upon the core of the reel, as is shown in the drawing, a ring having no split portions may be utilized. In this event, the end of the cable and its connector can be placed over the outer periphery of the ring and inserted into the space between said ring and the end plate.

What is claimed is:

1. A reel for supporting cable comprising two end plates, a core to which said end plates are secured, a first annular plate rigidly secured to said core and intermediate said end plates, said first annular plate having a slot extending from its periphery substantially to said core, a second annular plate about and spaced from said core and yieldingly secured to said first annular plate, said second annular plate having a slot which is in register with the slot of said first annular plate, said slots defining a passageway for said cable, said second annular plate being between said first annular plate and one of said end plates whereby the ends of said cable may be frictionally held between the said latter end plate and said second annular plate.

2. A reel for supporting cable comprising two end plates, a core to which said end plates are secured, an annular plate fixedly secured to said core and intermediate said end plates, said annular plate having at least one slot therein extending from the periphery of said plate to said core, a pressure plate yieldingly secured and normally parallel to said annular plate between said annular plate and one of said end plates and spaced from said core, said pressure plate having at least one slot therein which is in register with the slot of said annular plate, said slots defining a passageway for said cable whereby the ends of said cable will be frictionally held between the said latter end plate and said second ring.

CORNELIUS E. BADIK.
JOHN J. REILLY, Jr.

References Cited in the file of this patent

UNITED STATES PATENTS

| Number | Name | Date |
| --- | --- | --- |
| 629,115 | Turney | July 18, 1899 |
| 1,454,818 | Jones | May 8, 1923 |
| 1,852,953 | Clinton | Apr. 5, 1932 |
| 1,868,408 | Clinton | July 19, 1932 |
| 1,881,383 | Wylie | Oct. 4, 1932 |